United States Patent [19]

Fox

[11] Patent Number: 4,988,941
[45] Date of Patent: Jan. 29, 1991

[54] GENERATOR VOLTAGE REGULATION WITH NON-LINEAR COMPENSATION

[75] Inventor: David A. Fox, Shawnee Township, Allen County, Ohio

[73] Assignee: Westinghouse Electric Corp., Pittsburgh, Pa.

[21] Appl. No.: 554,095

[22] Filed: Jul. 13, 1990

Related U.S. Application Data

[63] Continuation of Ser. No. 290,344, Dec. 29, 1988, abandoned.

[51] Int. Cl.$^5$ ................................................ H02J 7/14
[52] U.S. Cl. ........................................ 322/28; 322/25
[58] Field of Search ................... 322/7, 24, 25, 27, 28, 322/29, 59, 73, 99, DIG. 2

[56] References Cited

U.S. PATENT DOCUMENTS

| | | | |
|---|---|---|---|
| 3,775,666 | 11/1973 | Smith | 322/28 |
| 3,916,291 | 10/1975 | Raczkowski | 322/28 X |
| 4,044,296 | 8/1977 | Dhyanchand et al. | 322/25 |
| 4,446,417 | 5/1984 | Fox et al. | 322/25 |
| 4,486,702 | 12/1984 | Edwards | 322/28 |

Primary Examiner—Peter S. Wong
Assistant Examiner—Kristine Peckman
Attorney, Agent, or Firm—R. P. Lenart

[57] ABSTRACT

A method of regulating the output voltage of an electric generator combines a signal representative of the actual output of the generator with a reference signal to obtain a control signal proportional to the difference between the desired output and the actual output. The control signal is modified by a non-linear transfer function which is representative of the gain of the generator over an expected operating speed and load range. The exciter field current of the generator is controlled in response to the modified control signal, thereby causing the actual output to approach the desired output. Compensation for variation in generator gain is provided by a non-linear element, inserted in the voltage control loop such that the total loop gain is substantially constant over the operating speed and load range of the generator.

8 Claims, 2 Drawing Sheets

GENERATOR VOLTAGE REGULATION WITH NON-LINEAR COMPENSATION

This application is a continuation of application Ser. No. 07/290,344, filed Dec. 19, 1988, now abandoned.

BACKGROUND OF THE INVENTION

This invention relates to voltage regulation of electric generators and, more particularly, to a method and circuit for regulating the output voltage of an electric generator which is subject to varying loads and may be driven at varying speeds.

Typical voltage regulators which are used to regulate the output voltage of electric generators include a sensing circuit that produces a voltage signal proportional to the AC or DC output of the generator. This signal is subtracted from a reference signal to develop a signal proportional to the error in the generator output. A compensator modifies the gain of the voltage regulator control loop. The output of the compensator is amplified and used to control the exciter field current in the generator. The output of the generator is proportional to the exciter field current. The gain and response of each element in the control loop can be measured and the compensator can be designed to achieve the desired transient response in accordance with well known feedback control methods.

In certain electrical systems, such as those found in aircraft, the generator must operate over a wide speed range. Since the gain (ratio of the output voltage to exciter field current) of a generator is proportional to its rotational speed and decreases as load is applied, voltage regulators constructed as discussed above may produce an unacceptable transient response as a load is applied or removed from the generator at various speeds. For example, when a load is applied to a generator operating near the low end of its operating speed range, the generator output initially decreases and slowly recovers because the gain of the voltage control loop is relatively low. The gain cannot be significantly increased because a load removal at high speed would result in a seriously underdamped condition. There is a considerable difference in transient response over the required speed and load range. The present invention seeks to provide a voltage regulator which improves generator transient response over the expected operating speed and load range.

SUMMARY OF THE INVENTION

Generator voltage regulators constructed in accordance with this invention include a non-linear element in the voltage control loop to compensate for gain variations in the generator due to changes in speed and load, thereby improving the overall transient response to the system. This invention encompasses a method of regulating the output voltage of an electric generator, including the steps of producing a first signal representative of the actual output of the generator, and combining the first signal with a reference signal to obtain a control signal which varies in proportion to the difference between the desired output of the generator and the actual output. The control signal is modified by a non-linear transfer function which is representative of the gain of the generator over an expected operating speed and load range, and the exciter field current of the generator is controlled in response to the resulting modified control signal, thereby causing the actual output to approach the desired output. The generator output may be either an output voltage or current, either of which could be AC or DC.

This invention also encompasses voltage regulating circuits which perform the above method. In the preferred embodiment, the non-linear transfer function is an exponential function of the control signal.

DESCRIPTION OF THE PREFERRED EMBODIMENT

Figure 1:
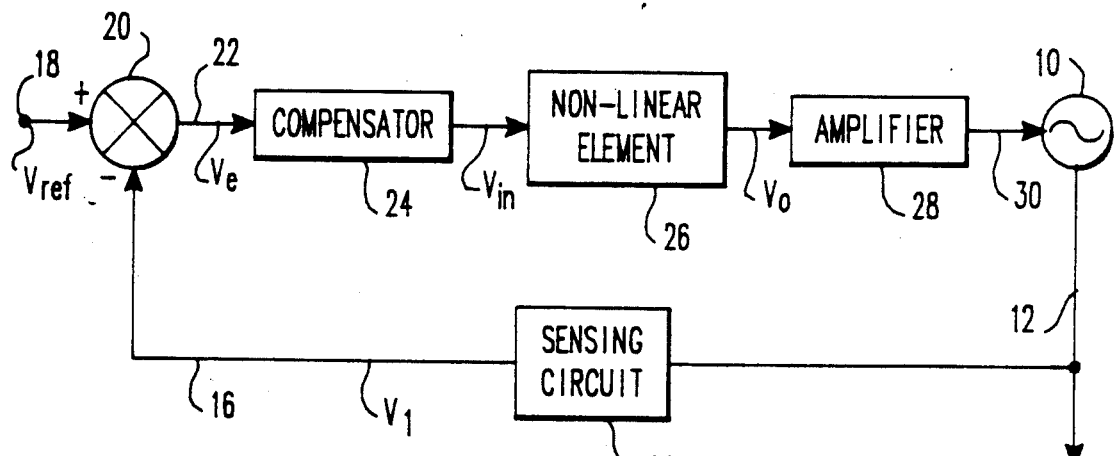
FIG. 1 is a block diagram of a voltage regulator constructed in accordance with one embodiment of the present invention.

Referring to the drawings, FIG. 1 is a block diagram of a generator and voltage regulator constructed in accordance with one embodiment of the present invention. A generator 10 is coupled to an external prime mover, not shown, which drives the generator at varying speeds. The generator produces a DC or AC output voltage on line 12. This voltage is sensed by sensing circuit 14 to produce a first voltage signal $V_1$ on line 16 which is representative of the generator output voltage. A reference voltage $V_{ref}$, which may be a DC voltage signal proportional to the desired output voltage of the generator, is supplied at point 18. The first voltage signal $V_1$ is subtracted from the voltage reference signal $V_{ref}$ at combination point 20 to produce an error signal $V_e$ on line 22. A compensator 24 receives the error signal and produces a control signal which serves as an input signal $V_{in}$ for the non-linear element 26. The transfer function of the non-linear element modifies the control signal $V_{in}$ to produce an output signal $V_o$. An amplifier 28 controls the exciter field current of generator 10 via line 30 in response to the output signal of a non-linear element.

Except for the non-linear element 26, all of the elements in FIG. 1 are found in existing voltage regulators. This invention adds the non-linear element, with the gain of that element being made to compensate for gain variations in the generator such that the total gain of the control loop is substantially constant over the operating speed and load range of the generator. The generator exciter field current, EFA, contains the information needed to determine the gain of the non-linear element. At low speeds and high loads, the EFA is high. At high speeds and light loads, the EFA is low. Thus the gain of the non-linear element should be proportional to the generator EFA. This gain is an incremental gain equivalent to the derivative of the transfer function at the operating point. Amplifier 28 controls the generator EFA such that it is proportional to $V_o$, the output of the non-linear element.

The ideal function for a non-linear compensator would be exponential. It is ideal because the derivative of the exponential function is proportional to the function itself. If the function is:

$$V_o = C e^{(\frac{V_{in}}{K})} \quad (1)$$

where K and C are constants, then:

$$G = \frac{dV_o}{dV_{in}} = \frac{C}{K} e^{(\frac{V_{in}}{K})} = \frac{1}{K} V_o \quad (2)$$

therefore, the gain is proportional to $V_o$ which is proportional to EFA. Unfortunately, available exponential function modules utilize a diode voltage-current characteristic, which is sensitive to temperature. Temperature drift in the compensator network is undesirable. Therefore, the preferred embodiment of this invention uses a function of the form:

$$V_o = \frac{V_{in}^n}{K} \quad (3)$$

or $$V_{in} = (KV_o)^{\frac{1}{n}} \quad (4)$$

where K is a constant. Then, $$G = \frac{dV_o}{dV_{in}} = \frac{nV_{in}^{n-1}}{K} = \frac{n}{K}(V_o K)^{\frac{n-1}{n}} = \frac{nV_o^{\frac{n-1}{n}}}{K^{\frac{1}{n}}} \quad (5)$$

$$G \propto V_o^{\frac{(n-1)}{n}} \propto EFA^{\frac{(n-1)}{n}} \quad (6)$$

Figure 2:
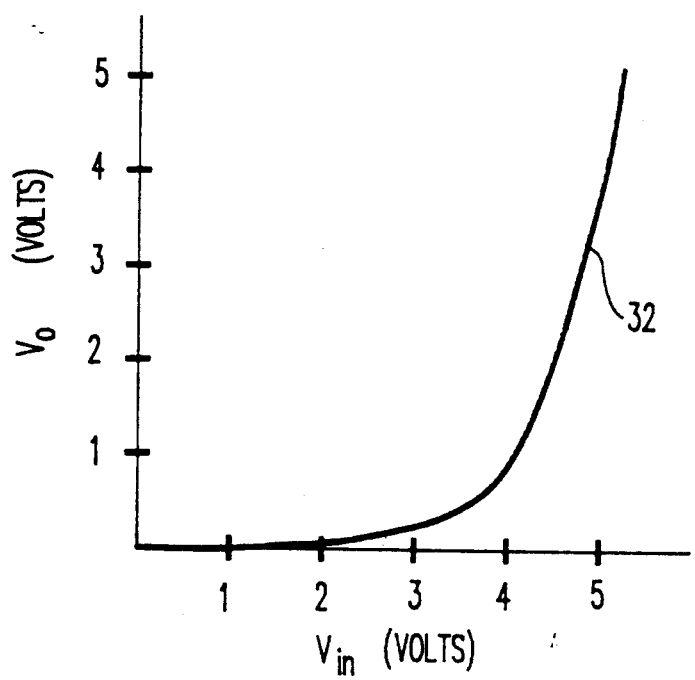
FIG. 2 is a plot of the non-linear transfer function used in the preferred embodiment of the present invention.
Figure 3:
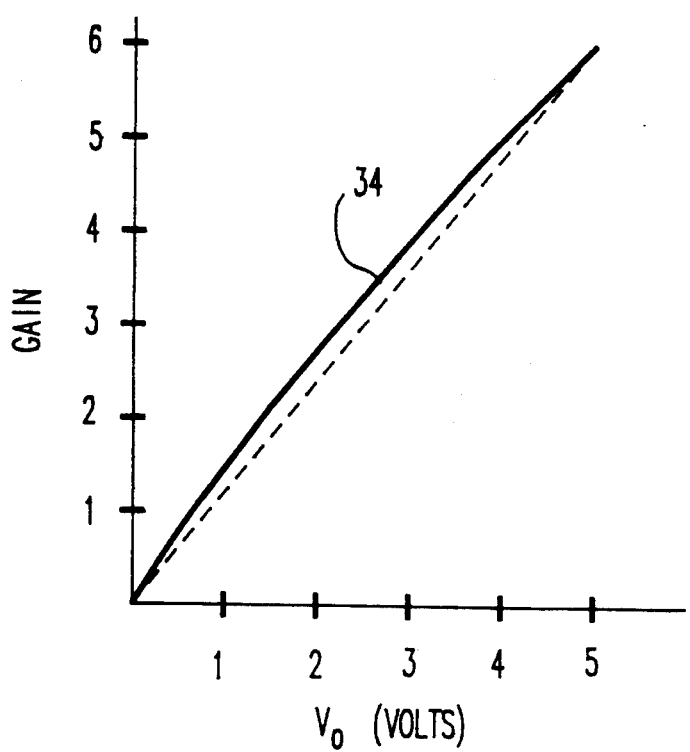
FIG. 3 is a graph illustrating the gain of the non-linear element in FIG. 1.

If n is large, then the gain is approximately proportional to $V_o$ as desired. FIG. 2 shows the transfer function 32 ($V_o$ versus $V_{in}$) of the non-linear element, and curve 34 in FIG. 3 shows the gain versus $V_o$ for n=6, which is readily available in integrated circuit functional modules. Note that the gain illustrated by curve 34 varies only slightly from a straight line proportional to $V_o$.

Figure 4:
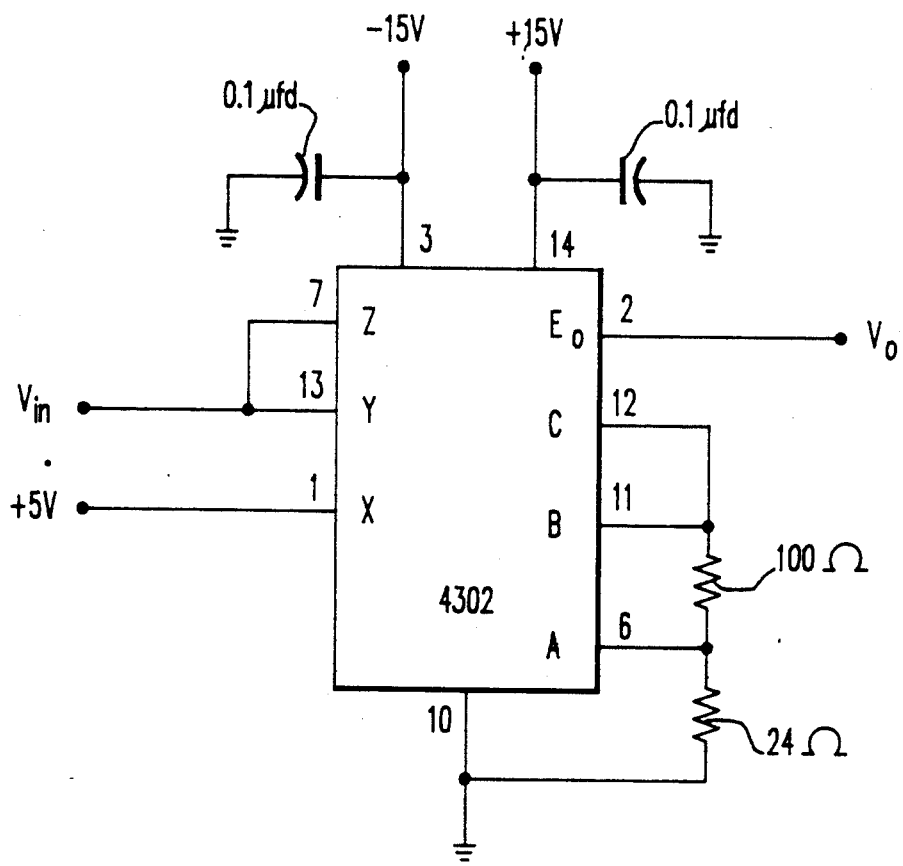
FIG. 4 is a schematic diagram of a non-linear element used in the preferred embodiment of this invention.

FIG. 4 is a schematic diagram of the non-linear compensator element used in the preferred embodiment of this invention. The active element is a Burr-Brown 4302 Multifunction Converter connected to develop the transfer function:

$$E_o = Y\left(\frac{Z}{X}\right)^m \quad (7)$$

With m=5, and a 5 volt reference input, the function is:

$$V_o = \frac{V_{in}^6}{5^5} \quad (8)$$

The gain is then:

$$G = 6\left(\frac{V_o}{5}\right)^{\frac{5}{6}} \quad (9)$$

which is the desired form.

By using the non-linear transfer function described above, the system response is improved for nearly all transient conditions. This results in consistent transient response over the required speed and load range. The insertion of a non-linear element is also compatible with existing sensing and amplifier circuits, and the technique of this invention is applicable to both AC and DC systems.

Although the present invention has been described in terms of what is at present believed to be its preferred embodiment, it will be apparent to those skilled in the art that various changes may be made without departing from the scope of the invention. For example, other transfer functions for the non-linear element can be developed with inputs for generator speed and load to further fine tune the system to meet specific requirements. In addition, although the preferred embodiment of this invention utilized generator output voltage sensing, output current sensing or a combination of current and voltage sensing may also be used. It is therefore intended that the appended claims cover such changes.

What is claimed is:

1. A method of regulating the output voltage of a variable speed electric generator, said method comprising the steps of:
   producing a first signal representative of the actual output of the generator;
   combining said first signal with a reference signal to obtain a control signal which varies in proportion to the difference between a desired output of said generator and said actual output of said generator;
   modifying said control signal by a non-linear transfer function which is representative of the gain of said generator over an expected operating speed and load range of said generator, such that the magnitude of the modified control signal is a non-linear function of the magnitude of the control signal; and
   controlling the current in an exciter field winding of said generator in response to the modified control signal, thereby causing said actual output to approach said desired output.

2. The method of claim 1, wherein said transfer function is of an exponential function.

3. The method of claim 1, wherein said transfer function is of the form $V_o = Ce^{V_{in}/K}$, where $V_{in}$ is the control signal, $V_o$ is the modified control signal, and C and K are constants.

4. The method of claim 1, wherein said transfer function is of the form $V_o = V_{in}^n/K$, where $V_{in}$ is the control signal, $V_o$ is the modified control signal, and n and K are constants.

5. A voltage regulator for regulating the output voltage of a variable speed electric generator, said voltage regulator comprising:
   means for producing a first signal representative of the actual output of the generator;
   means for combining said first signal with a reference signal to obtain a control signal which varies in proportion to the difference between a desired output of said generator and said actual output of said generator;

means for modifying said control signal by a non-linear transfer function which is representative of the gain of said generator over an expected operating speed and load range of said generator, such that the magnitude of the modified control signal is a non-linear function of the magnitude of the control signal; and means for controlling the current in an exciter field winding of said generator in response to the modified control signal, thereby causing said actual output to approach said desired output.

6. The voltage regulator of claim 5, wherein said transfer function is of an exponential function.

7. The voltage regulator of claim 5, wherein said transfer function is of the form $V_o = Ce^{V_{in}/K}$, where $V_{in}$ is the control signal, $V_o$ is the modified control signal, and C and K are constants.

8. The voltage regulator of claim 5, wherein said transfer function is of the form $V_o = V_{in}^n/K$, where $V_{in}$ is the control signal, $V_o$ is the modified control signal, and n and K are constants.

* * * * *